US009197063B2

(12) United States Patent
Morati et al.

(10) Patent No.: US 9,197,063 B2
(45) Date of Patent: Nov. 24, 2015

(54) REACTIVE ENERGY COMPENSATOR AND METHOD FOR REDUCING THE ASSOCIATED FLICKERING PHENOMENON

(71) Applicant: GE Energy Power Conversion Technology Ltd., Rugby, Warwickshire (GB)

(72) Inventors: Mathieu Morati, Belfort (FR); Franck Terrien, Evette Salbert (FR)

(73) Assignee: GE Energy Power Conversion Technology Ltd. (GB)

( * ) Notice: Subject to any disclaimer, the term of this patent is extended or adjusted under 35 U.S.C. 154(b) by 517 days.

(21) Appl. No.: 13/706,916

(22) Filed: Dec. 6, 2012

(65) Prior Publication Data
US 2013/0162049 A1    Jun. 27, 2013

(30) Foreign Application Priority Data
Dec. 6, 2011    (FR) ...................................... 11 61234

(51) Int. Cl.
*H02J 1/00* (2006.01)
*H02J 3/16* (2006.01)
*H02J 3/00* (2006.01)

(52) U.S. Cl.
CPC ... *H02J 1/00* (2013.01); *H02J 3/16* (2013.01); *H02J 2003/002* (2013.01); *Y02E 40/34* (2013.01); *Y10T 307/707* (2015.04)

(58) Field of Classification Search
CPC ......... H02J 1/00; H02J 3/16; H02J 2003/002; Y02E 40/34; Y10T 307/707

USPC ........................................................... 307/82
See application file for complete search history.

(56) References Cited

U.S. PATENT DOCUMENTS

| 6,075,350 A | 6/2000 | Peng |
| 2005/0035815 A1 | 2/2005 | Cheng et al. |
| 2006/0044850 A1 | 3/2006 | Wu et al. |

OTHER PUBLICATIONS

Search Report and Written Opinion for corresponding patent application No. 1161234 dated Apr. 12, 2012, 6 pages.

*Primary Examiner* — Thienvu Tran
*Assistant Examiner* — Kevin J Comber
(74) *Attorney, Agent, or Firm* — Parks Wood LLC

(57) ABSTRACT

A reactive energy compensator (10) comprising:
  an input DC voltage ($V_c$) bus (13) capable of providing reactive energy;
  an inverter (18) connected to the DC voltage bus (13) and including controllable electronic switches (34) capable of converting the input DC voltage ($V_c$) into an intermediate alternating voltage,
  a device (22) for controlling the electronic switches,
  regulation means (22) for determining a value of a target active current circulating between the inverter and the network, capable of regulating the input direct current voltage ($V_c$) relatively to a set reference value;
the device for controlling the switches, determining control signals according to the value of said target active current, determined from the error between the reference value and the square of the DC voltage of the bus via a transfer function, the definition of which varies according to the current value of said DC voltage.

8 Claims, 3 Drawing Sheets

REACTIVE ENERGY COMPENSATOR AND METHOD FOR REDUCING THE ASSOCIATED FLICKERING PHENOMENON

CROSS-REFERENCE TO RELATED APPLICATIONS

This application claims priority under 35 USC §119 to French patent application FR 11 61234, filed Dec. 6, 2011, which is incorporated herein by reference in its entirety.

The present invention relates to a reactive energy compensator capable of being electrically connected to an alternating electric network including M phase(s), M being greater than or equal to 1, of the type comprising:
- M terminals for connecting to the alternating electric network, said or each connecting terminal corresponding to one phase of the network,
- at least one input DC voltage bus capable of providing reactive energy,
- at least one inverter connected to the DC voltage bus and including controllable electronic switches capable of converting the input DC voltage into an intermediate alternating voltage including M phase(s) and corresponding to one phase of the intermediate current, the intermediate terminals corresponding to a same phase being connected to the corresponding connection terminal,
- a device for calculating signals for controlling the electronic switches of the inverters.

A reactive energy compensator of the aforementioned type is known from the document <<Modern active filters and traditional passive filters>> of H. Akagi, published in 2006 in <<Bulletin of the Polish Academy of Sciences—Technical sciences—Vol. 4—No. 3>>. Six inverters are connected in parallel to each other and connected on one side to a bank of capacitors, and on the other side to a three-phase network. The six inverters are connected together, on the side of the three-phase network, via a transformer including six secondary circuits. The signals for controlling the electronic switches of these inverters are pulse-width modulated signals.

Such a reactive energy compensator placed in an electric network gives the possibility of compensating for the circulation of reactive power from a load connected onto the electric network which affects the quality of the electric power delivered on the network.

Nevertheless, in such an electric network, flickering problems, further called scintillation problems, may arise on devices connected to the network, for example on computer screens or light sources. They correspond to fluctuation phenomena of the electric voltage delivered by the network, caused by electromagnetic perturbations or changes in power on the network for example caused by disconnections of devices with high electric consumption, such as arc furnaces, motors, etc. The object of the invention is to reduce these flickering problems.

For this purpose, according to a first aspect, the object of the invention is a reactive energy compensator of the aforementioned type, characterized in that it further includes regulation means, adapted for determining the value of a target active current circulating between the inverter and the network capable of regulating the input direct current voltage relatively to a set reference value;
the device for calculating signals for controlling the switches, determining control signals depending on the value of said determined target active current;
the target active current value being determined from the error between the reference value and the square of the DC voltage of the bus via a transfer function, the definition of which varies according to the current value of said DC voltage.

Such a reactive energy compensator gives the possibility of compensating for the reactive energy of loads on the network, while reducing the occurrence of flickering phenomena on the network.

In embodiments, the reactive energy compensator according to the invention further includes one or more of the following features:
- the DC voltage bus comprises a bank of capacitor(s), the bank of capacitor(s) including at least one capacitor;
- the Laplace transform of the transfer function $C_{DC}(p)$ is written as:

$$C_{DC}(p) = K_{dc} \text{ or }$$
$$C_{DC}(p) = K_{dc} + \frac{K_{idc}}{p}$$

with
$$K_{dc} = A * [1 + B * f(Vc, Vref)]$$
and
$$K_{idc} = C * [1 + D * f(Vc, Vref)], A, B, C \text{ and } D$$

being constants and f(Vc,Vref) being a function for which the input variables are the current values of the input voltage Vc and of the reference value Vref;
- the regulation means are further adapted for determining a value of a target reactive current circulating between the inverter and the network with view to compensating for reactive energy from a load on the network, the device for calculating signals for controlling the switches, determining control signals depending on the value of said determined target reactive current.

According to a second aspect, the present invention proposes a method for reducing the flickering phenomenon in an alternating electric network, said method being intended to be applied in a reactive energy compensator capable of being electrically connected to the alternating electric network including M phase(s), M being greater than or equal to 1, said compensator comprising:
- M terminals for connection to the alternating electric network, said or each connecting terminal corresponding to a phase of the network,
- at least one input DC voltage bus capable of providing reactive energy,
- at least one inverter connected to the DC voltage bus and including controllable electronic switches capable of converting the input DC voltage into an intermediate alternating voltage including M phase(s) and corresponding to a phase of the intermediate current, the intermediate terminals corresponding to a same phase, being connected to the corresponding connecting terminal,
- a device for calculating signals for controlling the electronic switches of the inverters, said method being characterized in that it includes the following steps:
determining, by regulation means, a value of a target active current circulating between the inverter and the network capable of regulating the input direct current voltage relatively to a set reference value, said value of a target active current, being determined from the error between the reference value and the square of the DC voltage of the bus via a transfer function, the definition of which varies according to the current DC voltage value;

determining, by the device for calculating signals for controlling the switches, control signals according to the determined value of said target active current.

These features and advantages of the invention will become apparent upon reading the description which follows, only given as an example and made with reference to the appended drawings, wherein.

Figure 1:
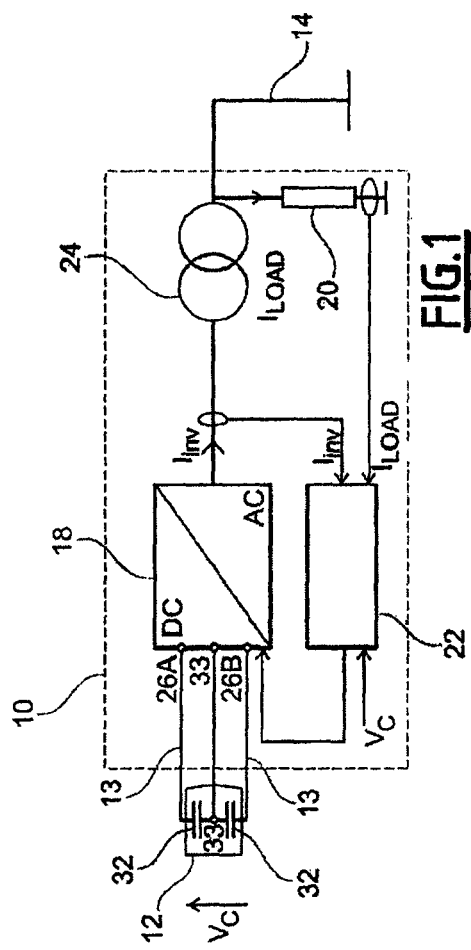
FIG. 1 illustrates a conversion system in an embodiment of the invention.

FIG. 1 illustrates a system 10 for converting an input direct current into an output polyphase alternating current which also achieves conversion of an input DC voltage into an output polyphase alternating voltage. The conversion system 10 is connected to a DC current source 12 and to a DC voltage (Vc) bus 13 on the one hand. It is connected to an electric network 14 on the other hand.

The DC voltage bus 13 provides a voltage Vc, with a value for example equal to 15 kV.

The electric network 14 is for example a three-phase alternating network with a high voltage, typically of the order of 33,000 V.

A load, 20, for example an arc furnace, is also connected to the electric network 14.

The current conversion system 10 comprises a voltage inverter 18 capable of converting an input direct current into an output polyphase alternating current. This inverter is connected to the current source 12 via the DC voltage bus 13.

In the relevant embodiment, the current source 12 includes a bank of two capacitors 32 separated by a neutral point 33.

The current $I_{inv}$ appearing in FIG. 1 identifies an alternating current provided as the output of the inverter for any phase.

The conversion system 10 also includes means 22 for controlling the inverter 18, adapted so as to control the inverter so as to drive the output current delivered by the inverter 18 for each phase.

Figure 3:
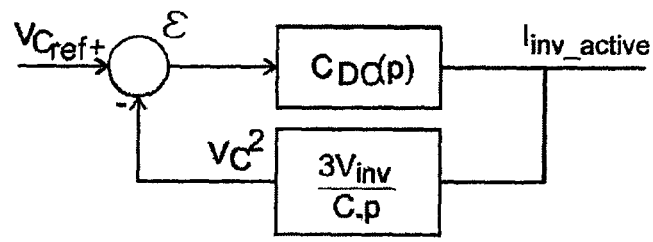
FIG. 3 illustrates a linear system in a closed loop.

The conversion system 10 also includes impedances on each phase which are illustrated in FIG. 3, connected at the output of the inverter 18 and a voltage transformer 24. The output of the transformer 24 is connected to the electric network 14.

Figure 2:
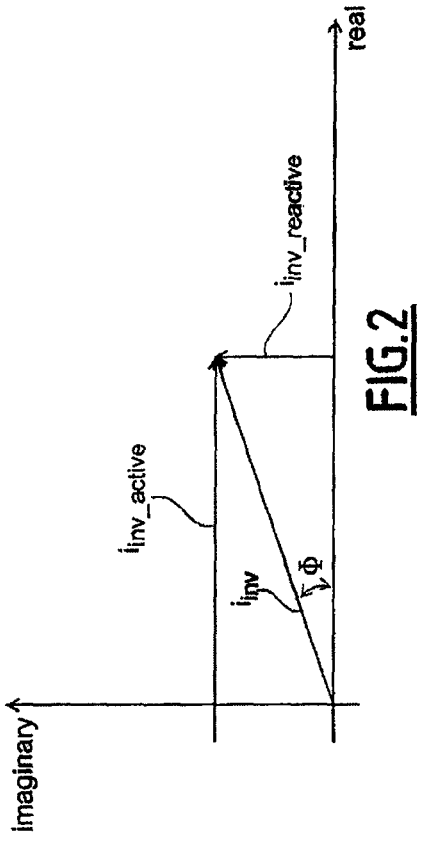
FIG. 2 illustrates the active and reactive components of an electric signal of the current or voltage type.

FIG. 2 provides a vectorial representation of a current $I_{inv}$ provided by the conversion system 10 relatively to a voltage $V_{inv}$ delivered on the network 14 by the conversion system 10. The current $I_{inv}$ is phase-shifted by an angle φ relatively to the voltage $V_{inv}$. In FIG. 2, the active component (or real component) $I_{inv\_actif}$ of the current $I_{inv}$ is distinguished parallel to the abscissa, in phase with the voltage $V_{inv}$, and the reactive component (or imaginary component) $I_{inv\_réactif}$ of the current $I_{inv}$ parallel to the ordinates.

In the relevant embodiment, the conversion system 10 is a reactive energy compensator capable of compensating for variations of reactive energy on the alternating network 14, via the direct current source 12 and the direct voltage bus 13, capable of providing reactive energy, by adjusting the phases of the electric current relatively to those of the electric voltage, delivered on the network.

The voltage inverter 18 includes an input positive terminal 26A, an input negative terminal 26B, a neutral terminal 33 and M output terminals. Each output terminal corresponds to a respective phase of the output polyphase alternating current capable of being delivered by the inverter. The output current includes a plurality M of phases, M being an integer greater than or equal to one.

Figure 5:
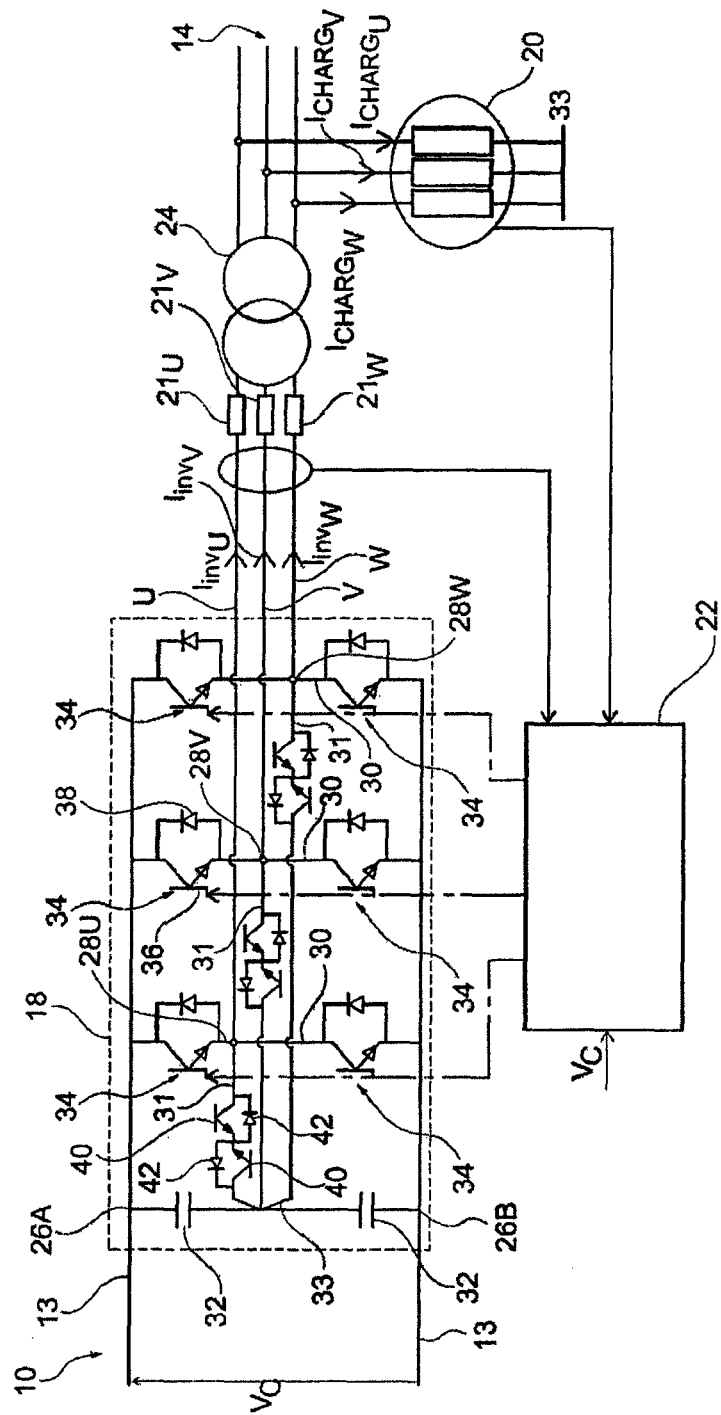
FIG. 5 illustrates a conversion system in an embodiment of the invention.

In the exemplary embodiment of FIG. 5, the number M of phases is equal to three and the voltage inverter 18 is a three-level three-phase inverter clamped by the neutral.

The three-phase inverter 18 comprises an input positive terminal 26A, an output negative terminal 26B and three output terminals 28U, 28V, 28W each corresponding to a respective phase U, V, W.

The inverter 18 further comprises, for each output terminal 28U, 28V, 28W, a switching branch 30 connected between both input terminals 26A, 26B and a clamping branch 31 connecting the neutral to a middle point of the associated switching branch. At the output of the inverter 18, the current $I_{invU}$, $I_{invV}$, $I_{invW}$ circulates on the phase U, V, W respectively.

The DC voltage source 12 comprises two capacitors 32 connected in series between both input terminals 26A, 26B and connected together in a middle point 33 forming the neutral.

Alternatively, each capacitor 32 is replaced with a DC voltage source.

Each switching branch 30 comprises two controllable electric switches 34 connected in series and in the same direction, and connected together through a middle point, each middle point forming an output terminal 28U, 28V, 28W.

As known per se, each electric switch 34 is a bidirectional current switch and a unidirectional voltage switch. Each electric switch 34 comprises a transistor 36 and a diode 38 in an antiparallel configuration thereby providing bidirectional current circulation paths when the transistor 36 is conducting.

All the electric switches 34 are for example identical. Transistor 36 is for example an insulated gate bipolar transistor, also called an IGBT (Insulated Gate Bipolar Transistor).transistor. The gate of each transistor 36 is connected to the control means 22 in order to receive a corresponding control signal.

Each clamping branch 31 is connected between the middle point 33 and an output terminal 28U, 28V, 28W. Each clamping branch 31 includes two transistors 40 connected head-to-tail and in series. It also includes two diodes 42, each being connected in an antiparallel configuration on a respective transistor 40, thereby providing bidirectional current circulation paths when the corresponding transistor 40 is conducting.

The transistors 40 are for example IGBT transistors.

Between the conversion system 10 and the transformer 24, an inductance $21_u$, $21_v$, $21_w$, is positioned on phase U, V, W respectively.

The load 20 consumes a respective current $I_{LOADU}$, $I_{LOADV}$, $I_{LOADW}$ on the route U, V, W respectively.

In the relevant embodiment, the control means 22 are adapted for driving and controlling the compensation for the circulation of reactive power on the network 14 and for thereby increasing the power factor of the network on the one hand, and for driving and controlling the reduction of the flickering phenomena occurring on the network 14 on the other hand.

Let C be the value of the capacitance of the DC voltage source 12 expressed in farads, the active power $P_{inv}$ (t), depending on time t, which is exchanged between the inverter 18 and the network 14 on any relevant phase U, V or W, may be expressed in this way:

$$P_{inv}(t) = C\frac{dV_c}{dt} \times V_c = \frac{1}{2} \times C \times \frac{dV_c^2}{dt}; \quad (1)$$

wherein $V_c$ is the voltage on the terminals of the DC voltage source 12.

By using the Concordia transform, and then the Park transform, this equation (1) is written in the following way:

$$\frac{3}{2} \times V_{inv} \times I_{inv\_active} = \frac{1}{2} \times C \times \frac{dV_c^2}{dt}; \quad (2)$$

wherein $V_{ond}$ is the output voltage of the inverter in the Park reference system and $I_{inv\_active}$ is the active current component in the Park reference system at the output of the inverter 18.

By using Laplace's transform equation (2) gives:

$$3 \times V_{inv} \times I_{inv\_active} = C \times V_c^2(p) \times p \quad (3);$$

wherein p is the Laplace operator.

In the relevant conversion system 10, by driving the value of the current $I_{inv\_active}$ it is possible to regulate the voltage $V_c$ of the voltage source 12. Formula (3) describes the relationship between the active current of the inverter $I_{inv\_active}$ and the square of the voltage of the voltage source. By controlling $I_{inv\_actif}$, $V_c^2$ and therefore the voltage $V_c$ are controlled.

In order to apply this driving, a target active current value at the output of the inverter 18 is determined according to equation (4):

$$I_{inv\_active}(p) = C_{DC}(p) \times (V_{ref} - V_c^2(p)), \quad (4)$$

wherein $C_{DC}(p)$ is the transfer function of the regulator $C_{DC}$, expressed by means of the Laplace transform, relating the Laplace transform of the current $I_{inv\_active}$ (p) and the Laplace transform of the error between the square of the voltage on the terminals of the DC voltage source and a reference voltage of set value $V_{ref}$ such that the voltage $V_c$ of the DC current source 12 is desirably stabilized to the value $V_{ref}$.

The linear system with a closed loop corresponding to equations 3 and 4 is illustrated in FIG. 3.

The corresponding transfer function in an open loop FTBO (p) and the corresponding transfer function in a closed loop FTBF(p) are therefore written as:

$$FTBO = C_{DC}(p) \times 3 \times \frac{V_{inv}}{C \times p} = C_{DC}(p) \times \frac{K}{p} \quad (5)$$

$$\text{with } K = \frac{3 \cdot V_{inv}}{C} \approx \text{constant}$$

$$FTBF = \frac{1}{1 + \frac{p}{K \times C_{DC}(p)}} \quad (6)$$

In these formulae, $V_{inv}$ is a value which may be considered as an average value constant. This statement is true since this equation is developed from formula (2) which is expressed in the Park reference system.

The determined target current value $I_{inv\_active}$ by means of this control loop illustrated in FIG. 3 corresponds to the active current reference which the conversion system 10 has to provide in order to regulate the voltage of the DC voltage bus 13 to the reference value $V_{ref}$.

According to the invention, the regulator $C_{DC}(p)$ is adjustable depending on the measured current value of the voltage $V_c$. This arrangement has the function of ensuring regulation of the voltage $V_c$ in a set interval of values around the value $V_{ref}$, while letting the voltage $V_c$ of the DC voltage bus 13 freely fluctuate in this interval. This fluctuation has the effect of reducing the number of flickering events in the network 14.

Thus, as the value of the voltage $V_c$ is actually within the fluctuation interval, the regulator $C_{DC}(p)$ is very slow, of the order of one second. Conversely, the more the value of the voltage approaches the limits of the fluctuation interval, the faster is the regulator $C_{DC}(p)$ so that the value of the voltage $V_c$ does not exit the fluctuation interval.

In an embodiment, the formula of $C_{DC}(p)$ is the following:

$$C_{DC}(p) = \frac{1}{T \times K} = K_{DC} \quad (7)$$

wherein K is the term described in (5) which is constant. It is $K_{DC}$ which has to vary according to Vc. In order to increase the rapidity of the regulator, the value of $C_{DC}(p)$ has to be changed and therefore that of $K_{DC}$ as a function of Vc. The variation law of $K_{DC}$ in formula (7) is for example: Kdc=A* [1+B*f($V_c$, $V_{ref}$)], wherein f($V_c$,$V_{ref}$) is a mathematical function (absolute value function, square function, linear or non-linear functions, etc., . . . ), the variables of which are $V_c$ and $V_{ref}$. A and B are gains (not variable according to $V_c$ and $V_{ref}$) depending on several parameters of the system which are desirably controlled, such as for example the value of the storage capacity of the DC bus, the control rapidity of the compensator etc. . . .

Such a corrector $C_{DC}(p)$ is of the proportional type.

In another embodiment, the formula of $C_{DC}(p)$ is the following:

$$C_{DC}(p) = K_{dc} + \frac{K_{idc}}{p} \quad (8)$$

wherein $K_{idc}$ and $K_{dc}$ may vary according to several laws, for example:

$$Kdc = A*[1+B*f(V_c, V_{ref})]$$

$$Kidc = C*[1+D*f(V_c, V_{ref})]$$

wherein f($V_c$, $V_{ref}$) is a mathematical function (absolute value, square function, linear or non linear functions, etc. . . . ), the variables of which are $V_c$ and $V_{ref}$ A,B,C,D are gains depending several parameters of the system which are desirably controlled, such as for example the value of the storage capacity of the DC bus, the control rapidity of the compensator, etc. . . .

Such a corrector $C_{DC}(p)$ is of the Proportional Integral type.

Figure 4:
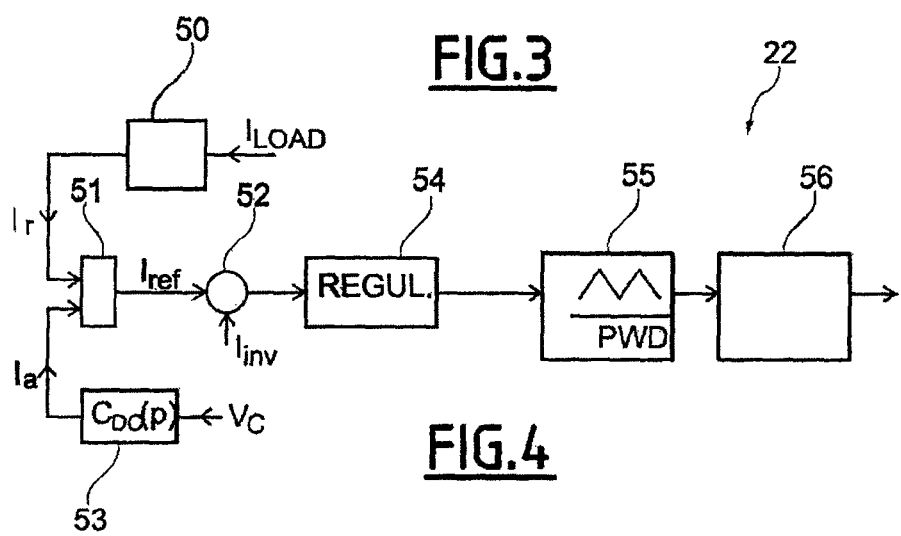
FIG. 4 illustrates control means in an embodiment of the invention.

The processing modules of the control means 22 adapted on the one hand for allowing compensation of the reactive energy on the network 14 and on the other hand for reducing flickering problems, are described with reference to FIG. 4.

The current in the load 20 and the current delivered by the inverter which are relative to a same phase will respectively be designated as $I_{LOAD}$ and $I_{inv}$.

A reactive power compensation block 50 receives at the input measurements of the current $I_{LOAD}$ consumed by the load 20 and is adapted so as to apply an algorithm for determining a target value of the current Ir at the output of the inverter 18 allowing compensation of the reactive power of the load 20 on the relevant phase.

This algorithm comprises the following steps:

Step 1: Identifying from the current $I_{LOAD}$, the reactive and active value of this current. With Park's transform, this identification is made possible by separating the currents on two quadrature axes, which correspond to the reactive and active portions of the measured current.

Step 2: The totality of the identified reactive current is sent as a reactive component reference to the summing circuit 51.

Step 3: Depending on the energy storage capacity of the DC bus, the totality or a portion of the active current identified from the current $I_{LOAD}$ is sent as an active component reference to the summing circuit 51.

Ir therefore corresponds to the sum of both of these currents as determined in these steps 2 and 3.

A control block 53 receives as an input the current value of the voltage on the terminals of the DC voltage source 12.

The control block 53 is adapted so as to determine, depending on this value, the formula of the regulator to be applied $C_{DC}(p)$. The control block 53 is adapted so as to calculate the target value of the active current 1a at the output of the inverter 18, according to formula 4, allowing regulation of the value of the voltage $V_c$ by reducing the flickering phenomena.

A summing circuit 51 is adapted so as to sum the target currents Ir and Ia determined by the reactive power compensation block 50 and the regulation block 53 and for thus determining a value $I_{ref}$ of the target current resulting from this sum.

This current $I_{ref}$ is the current to be provided by the inverter on the relevant phase which allows compensation of the reactive load on the one hand and reduction of the flickering problem on the other hand.

A subtracting circuit 52 allows calculation of the difference between this resulting target current $I_{ref}$ and the current value of the current $I_{inv}$ measured at the output of the inverter.

The value of this calculated difference is provided at the input of a current regulator 54. This regulator 54 is capable of calculating, according to the calculated difference, modulating voltage signals for the relevant phase.

This regulator is of the PI (Proportional Integral) type conventionally used in the regulation of looped systems (cf. for example http://en.wikipedia.org/wiki/PID_controller).

These modulating voltage signals are provided at the input of a modulator 55 suitable for proceeding with pulse width modulation with interlacing of the pulses and a phase shift corresponding to the relevant phase (cf http://en.wikipedia.org/wiki/Pulse-width_modulation for a general description of such a modulator). In one step, the modulator is adapted in order to compare a modulating voltage received at the input to a triangular signal.

The results of this comparison are provided at the input of a control module 56 capable of determining, according to said results of the control signals intended for the switches 34 of the relevant phase and of applying them to these switches 34.

Figure 6:
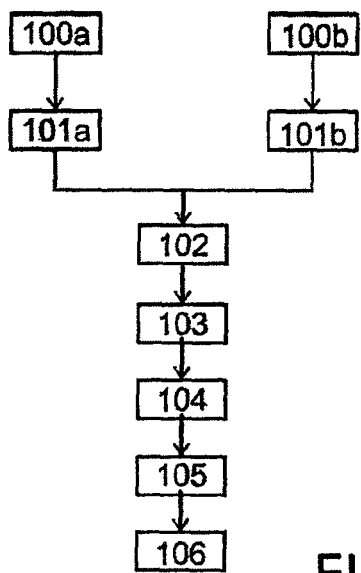
FIG. 6 is a flow chart of a method in an embodiment of the invention.

In FIG. 6, are illustrated the steps of a method in an embodiment of the invention, applied by the conversion system 10.

In a step 100a, $I_{LOAD}$ circulating in the load 20 of the network 14, relatively to a given phase, is measured.

In a step 101a, a reactive target current Ir to be provided by the inverter 18 is determined according to the measured current circulating in the load 20.

In parallel with these steps 100a, 101a, in a step 100b, a current $I_{inv}$ circulating at the output of the inverter 18 on the relevant phase, is measured.

In a step 101b, an active target current 1a to be provided by the inverter 18 is determined according to the current circulating in the load 20, measured, as described above by means of the regulator $C_{DC}(p)$, according to formula 4, allowing regulation of the voltage $V_c$ by reducing the flickering phenomena.

In a step 102, the target currents Ir and Ia are summed, the result of this sum determining a value $I_{ref}$ of the target current resulting from this sum.

This current $I_{ref}$ is the target current, to be provided by the inverter 18 on the relevant phase, which allows compensation for the reactive load on the one hand and reduction of the flickering problem on the other hand.

In a step 103, the difference between this resulting target current $I_{ref}$ and the current value of the current $I_{inv}$ measured at the output of the inverter is calculated.

In a step 104, modulating voltage signals of the relevant phase are determined, depending on the calculated difference, as described above.

In a step 105, pulse width modulation with interlacing of the pulses with a phase shift corresponding to the relevant phase is achieved according to these modulating voltage signals, comprising an operation for a comparison between a modulating voltage and a triangular signal.

In a step 106, control signals intended for the switches 34 of the relevant phase are determined according to the modulation signals and applied to the switches 34 of the relevant phase.

The steps relating to the compensation of the reactive load on the one hand and to the reduction of the flickering may, according to the embodiments, either be applied sequentially or in parallel. In the case when this would be achieved sequentially, the reactive component of the measured current $I_{inv}$ is subtracted from the target reactive current Ir, with view to determining according to this difference, the control signals to be applied to the switches 34 in order to compensate for the reactive energy of the load.

Also, the component of the measured current $I_{inv}$ is subtracted from the target active current Ia, with view to determining, depending on this difference, the control signals to be applied to the switches 34 for reducing flickering on the network.

The invention therefore allows both reduction in the occurrence of flickering phenomena on the network 14, while compensating for the reactive power of loads on the network.

What is claimed is:

1. A reactive energy compensator capable of being electrically connected to an alternating electric network including M phase(s), M being greater than or equal to 1, of the type comprising:

M terminals for connecting to the alternating electric network, said or each connecting terminal corresponding to a phase of the network, at least one input DC voltage bus capable of providing reactive energy, at least one inverter connected to the DC voltage bus and including controllable electronic switches capable of converting the input DC voltage into an intermediate alternating voltage including M phase(s) and corresponding to a phase of the intermediate current, the intermediate terminals corresponding to a same phase being connected to the corresponding connecting terminal, a device for calculating signals for controlling the electronic switches of the inverters, further including regulation means, adapted for determining a value of a target active current circulating between the inverter and the network capable of regulating the input DC voltage with respect to a set reference voltage;

the device for calculating signals for controlling the switches determining control signals depending on the determined value of said target active current;

the target active current value being determined from the error between the reference value and the square of the DC voltage of the bus via a transfer function, the definition of which varies according to the current value of said DC voltage.

2. The reactive energy compensator according to claim 1, wherein the DC voltage bus comprises a bank of capacitor(s), the bank of capacitor(s) including at least one capacitor.

3. The reactive energy compensator according to claim 1, wherein the Laplace transform of the transfer function $C_{DC}(p)$ is written as:

$$C_{DC}(p) = K_{dc} \text{ or}$$

$$C_{DC}(p) = K_{dc} + \frac{K_{idc}}{p}$$

with $$K_{dc} = A * [1 + B * f(Vc, Vref)]$$

and $$K_{idc} = C * [1 + D * f(Vc, Vref)], A, B, C \text{ and } D$$

being constants and f(Vc,Vref) being a function, the input variables of which are the current values of the input voltage Vc and of the reference voltage Vref.

4. The reactive energy compensator according to claim 1, wherein the regulation means are further adapted in order to determine a value of a target reactive current circulating between the inverter and the network with view to compensating for a reactive energy from a load on the network, the device for calculating signals for controlling the switches, being adapted for determining control signals according to the determined value of said target reactive current.

5. A method for reducing flickering in an alternating electric network, said method being intended to be applied in a reactive energy compensator capable of being connected electrically to the alternating electric network including M phase(s), M being greater than or equal to 1, said compensator comprising:

M terminals for connecting to the alternating electric network, said or each connecting terminal corresponding to a phase of the network, at least one input DC voltage bus capable of providing reactive energy, at least one inverter connected to the DC voltage bus and including controllable electronic switches capable of converting the input DC voltage into an intermediate alternating voltage including M phase(s) and corresponding to a phase of the intermediate current, the intermediate terminals corresponding to a same phase being connected to the corresponding connecting terminal, a device for calculating signals for controlling the electronic switches of the inverters, said method including the following steps:

determining, by a regulation means, a value of a target active current circulating between the inverter and the network, capable of regulating the input DC voltage relatively to a set reference value, said target active current value being determined from the error between the reference value and the square of the DC voltage of the bus via a transfer function, the definition of which varies according to the current DC voltage value;

determining, by the device for calculating signals for controlling the switches, control signals according to the determined value of said target active current.

6. The method for reducing flickering according to claim 5, according to which the DC voltage is provided by a bank of capacitor(s) including at least one capacitor.

7. The method for reducing flickering according to claim 5, according to which the Laplace transform of the transfer function $C_{DC}(p)$ is written as:

$$C_{DC}(p) = K_{dc} \text{ or}$$

$$C_{DC}(p) = K_{dc} + \frac{K_{idc}}{p}$$

with $$K_{dc} = A * [1 + B * f(Vc, Vref)]$$

and $$K_{idc} = C * [1 + D * f(Vc, Vref)], A, B, C \text{ and } D$$

being constants and f(Vc,Vref) being a function, the input variables of which are the current values of the input voltage Vc and of the reference voltage Vref.

8. The method for reducing flickering according to claim 5, further comprising a step for determining, by the regulation means, a value of a target reactive current circulating between the inverter and the network with view to compensating for reactive energy from a load on the network, and a step for determining by the device for calculating signals for controlling the switches, control signals according to the determined value of said target reactive current.

* * * * *